United States Patent
Ozawa et al.

(10) Patent No.: US 10,207,574 B2
(45) Date of Patent: Feb. 19, 2019

(54) MOTOR VEHICLE

(71) Applicant: SUBARU CORPORATION, Tokyo (JP)

(72) Inventors: Hiroshi Ozawa, Tokyo (JP); Yu Onodera, Tokyo (JP); Keita Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/798,735

(22) Filed: Oct. 31, 2017

(65) Prior Publication Data
US 2018/0208038 A1   Jul. 26, 2018

(30) Foreign Application Priority Data
Jan. 20, 2017   (JP) .................................. 2017-008100

(51) Int. Cl.
| B60K 1/04 | (2006.01) |
| B62D 25/02 | (2006.01) |
| B62D 25/20 | (2006.01) |
| B62D 21/15 | (2006.01) |
| H01M 2/10 | (2006.01) |

(Continued)

(52) U.S. Cl.
CPC .............. *B60K 1/04* (2013.01); *B62D 21/157* (2013.01); *B62D 25/025* (2013.01); *B62D 25/2036* (2013.01); *B62D 27/065* (2013.01); *H01M 2/1083* (2013.01); *B60K 2001/0438* (2013.01);

(Continued)

(58) Field of Classification Search
CPC .... B60K 2001/0411; B60K 2001/0416; B60K 2001/0438; B60K 2001/0472
See application file for complete search history.

(56) References Cited

U.S. PATENT DOCUMENTS

| 8,839,895 B2 | 9/2014 | Kato et al. |
| 9,027,684 B2 * | 5/2015 | Araki ....................... B60K 1/04 |
| | | 180/311 |

(Continued)

FOREIGN PATENT DOCUMENTS

| DE | 102010033123 A1 | 2/2012 |
| DE | 202016103720 U1 | 8/2016 |

(Continued)

OTHER PUBLICATIONS

Japanese Office Action dated Jul. 19, 2018 for JP Patent Application No. 2017-008100 (3 pages in Japanese with English translation).

*Primary Examiner* — Erez Gurari
(74) *Attorney, Agent, or Firm* — Smith, Gambrell & Russell, LLP

(57) ABSTRACT

A motor vehicle includes side sills that are disposed in pairs on the right and left sides of the motor vehicle and that has bag-shaped cross-sections when viewed from the front of the motor vehicle and a floor panel that constitutes bottoms of at least a passenger compartment and that is coupled to the side sills. The motor vehicle further includes a battery panel that is disposed below the floor panel so as to support batteries and that is coupled to the side sills and a battery movement allowance mechanism that allows movement of the batteries toward the inside of the side sills when the batteries are moved to one side in a vehicle-width direction and, consequently, a load from the batteries is applied to the side sills.

16 Claims, 5 Drawing Sheets

(51) Int. Cl.
    *B62D 27/06*     (2006.01)
    *B60R 16/04*     (2006.01)

(52) U.S. Cl.
    CPC ......... *B60R 16/04* (2013.01); *H01M 2220/20* (2013.01)

(56) References Cited

U.S. PATENT DOCUMENTS

| | | | |
|---|---|---|---|
| 9,493,190 B1* | 11/2016 | Alwan | B62D 21/157 |
| 9,623,742 B2* | 4/2017 | Ikeda | B60K 1/04 |
| 9,956,859 B2* | 5/2018 | Ikeda | B60K 1/04 |
| 2011/0300426 A1* | 12/2011 | Iwasa | B60K 1/04 429/99 |
| 2012/0103714 A1* | 5/2012 | Choi | B60K 1/04 180/68.5 |
| 2013/0026786 A1* | 1/2013 | Saeki | B60K 1/04 296/187.12 |
| 2013/0133961 A1* | 5/2013 | Matsuda | B60K 6/40 180/65.22 |
| 2013/0192914 A1* | 8/2013 | Nakamori | B60K 1/04 180/68.5 |
| 2013/0248264 A1* | 9/2013 | Matsuda | B60K 1/04 180/65.22 |
| 2014/0291046 A1* | 10/2014 | Araki | B60K 1/04 180/68.5 |
| 2014/0338999 A1* | 11/2014 | Fujii | B60K 1/04 180/68.5 |
| 2014/0374180 A1* | 12/2014 | Katayama | B60K 1/04 180/68.5 |
| 2015/0174996 A1* | 6/2015 | Ikeda | B60K 1/04 180/68.5 |
| 2015/0249240 A1* | 9/2015 | Hihara | B60K 1/04 180/68.5 |
| 2016/0114667 A1* | 4/2016 | Ikeda | B60K 1/04 180/68.5 |
| 2016/0257346 A1 | 9/2016 | Wu et al. | |
| 2016/0339774 A1* | 11/2016 | Hayashi | B60K 1/00 |
| 2017/0029034 A1* | 2/2017 | Faruque | B60K 1/04 |
| 2017/0113731 A1* | 4/2017 | Imura | B62D 21/157 |
| 2017/0217297 A1* | 8/2017 | Li | B60K 1/04 |
| 2017/0305248 A1* | 10/2017 | Hara | B60K 1/04 |
| 2017/0305251 A1* | 10/2017 | Hara | B60K 1/04 |
| 2018/0050607 A1* | 2/2018 | Matecki | B60K 1/04 |
| 2018/0072352 A1* | 3/2018 | Shimoda | B60K 1/04 |
| 2018/0105062 A1* | 4/2018 | Fees | B60L 11/1877 |
| 2018/0134324 A1* | 5/2018 | Son | B62D 25/2027 |

FOREIGN PATENT DOCUMENTS

| | | |
|---|---|---|
| JP | H07-246843 A | 9/1995 |
| JP | 2000-344148 A | 12/2000 |
| JP | 2013-60160 A | 4/2013 |
| JP | 2013-067334 A | 4/2013 |
| JP | 2016-137754 A | 8/2016 |
| KR | 101274470 B1 | 6/2013 |

* cited by examiner

MOTOR VEHICLE

CROSS-REFERENCE TO RELATED APPLICATIONS

The present application claims priority from Japanese Patent Application No. 2017-008100 filed on Jan. 20, 2017, the entire contents of which are hereby incorporated by reference.

BACKGROUND

1. Technical Field

The present invention relates to a motor vehicle having a battery panel for the installation of batteries disposed below a floor panel thereof.

2. Related Art

There is known a motor vehicle provided with batteries disposed below a floor panel of the motor vehicle (for instance, Japanese Unexamined Patent Application Publication (JP-A) No. 2013-60160). The motor vehicle disclosed in JP-A No. 2013-60160 has a battery frame for the installation of the batteries disposed below a floor panel of the motor vehicle. Specifically, the motor vehicle disclosed in JP-A No. 2013-60160 is provided with a bracket between the floor panel and the battery frame on both sides, such that joining of an outer flange of the bracket and the floor panel is configured to have higher strength than joining of an inner flange of the bracket and the floor panel. This arrangement effectively reduces or prevents separation of the battery frame from the floor panel in the event of a side-impact collision of the motor vehicle.

However, in the motor vehicle disclosed in JP-A No. 2013-60160, there is a concern that the bracket may decrease the mounting space of the battery.

SUMMARY OF THE INVENTION

It is desirable to provide a motor vehicle that is capable of providing a greater battery mounting space while reducing or preventing separation of the battery from the vehicle body in the event of a side-impact collision or the like.

An aspect of the present invention provides a motor vehicle including side sills that are disposed in pairs on the right and left sides of the motor vehicle and that each have a bag-shaped cross-section when viewed from the front of the motor vehicle, a floor panel that constitutes the bottom of a passenger compartment and that is coupled to the side sills, a battery panel that is disposed below the floor panel and coupled to the side sills and support batteries, and a battery movement allowance mechanism that allows movement of the batteries toward the inside of the side sills at the time of a load being applied when the batteries are moved to one side in a vehicle-width direction and, consequently, the load from the batteries is applied to the side sills.

BRIEF DESCRIPTION OF THE DRAWINGS

FIG. 3A is a schematic cross-sectional view of a motor vehicle. FIG. 3B is an external perspective view of a battery and a stay. FIG. 3C is an explanatory diagram illustrating a situation in which movement of a battery toward the inside of a side sill is allowed at the time of a load being applied when the battery is moved to one side in the vehicle-width direction and, consequently, a load from the battery is applied to the side sill;

FIG. 4A is a schematic cross-sectional view of a motor vehicle. FIG. 4B is an explanatory diagram illustrating a situation in which movement of a battery toward the inside of a side sill is allowed at the time of a load being applied when the battery is moved to one side in the vehicle-width direction and, consequently, a load from the battery is applied to the side sill; FIG. 5A is a schematic cross-sectional view of a motor vehicle. FIG. 5B is an explanatory diagram illustrating a situation in which movement of a battery toward the inside of a side sill is allowed at the time of a load being applied when the battery is moved to one side in the vehicle-width direction and, consequently, a load from the battery is applied to the side sill.

DETAILED DESCRIPTION

Figure 1:
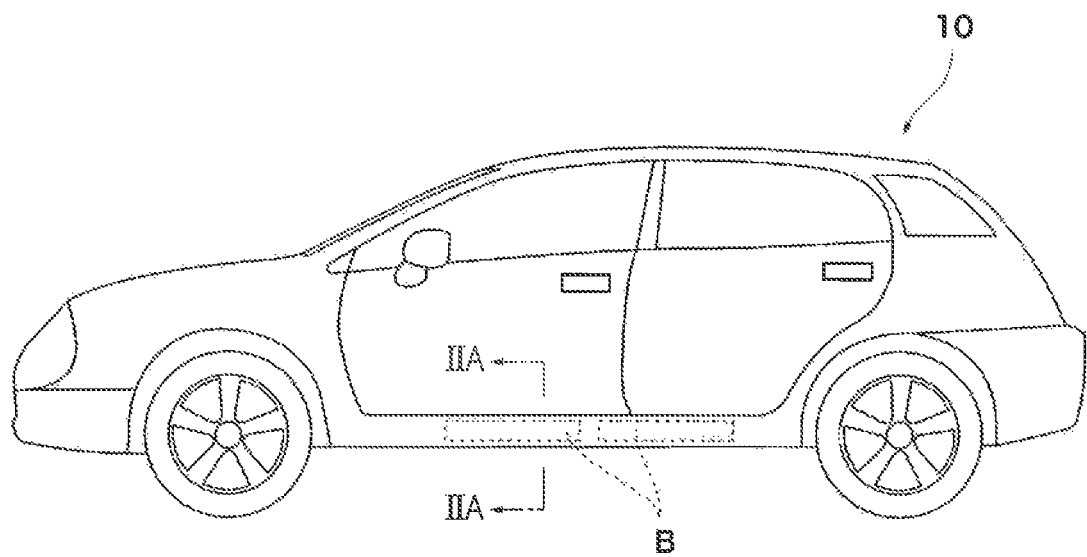
FIG. 1 is a schematic external view of a motor vehicle according to a first example of the present invention.
Figure 2A:
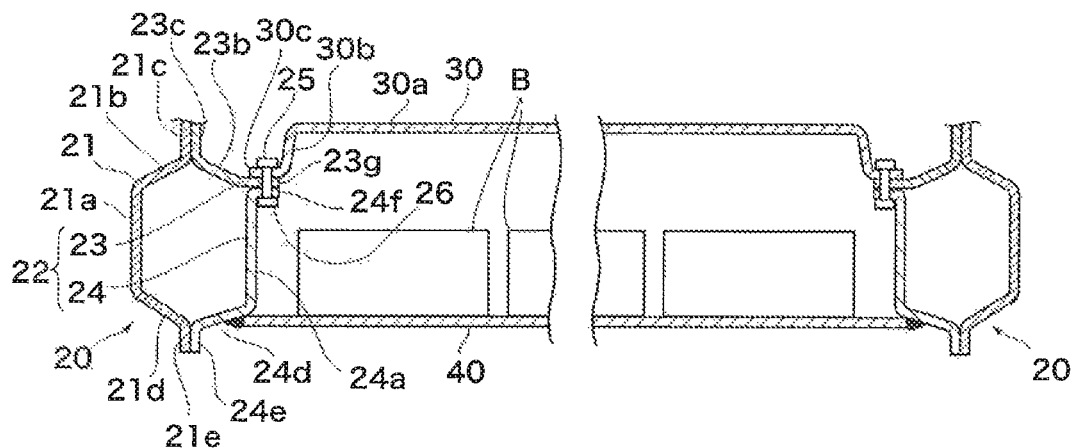
FIG. 2A is a cross-sectional view taken along line IIA-IIA of FIG. 1.
Figure 2B:
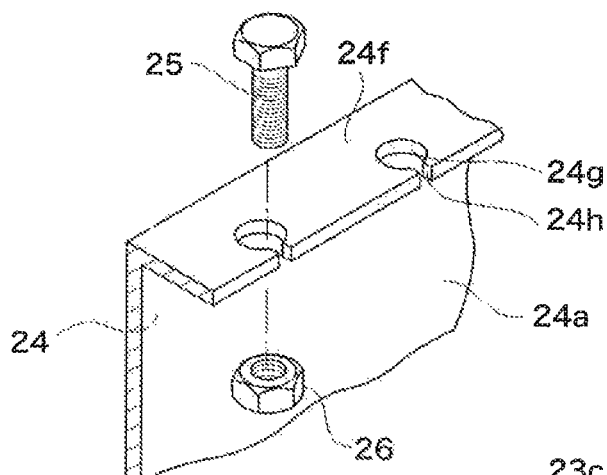
FIG. 2B is an explanatory diagram illustrating a fastening portion of a lower panel.
Figure 2C:
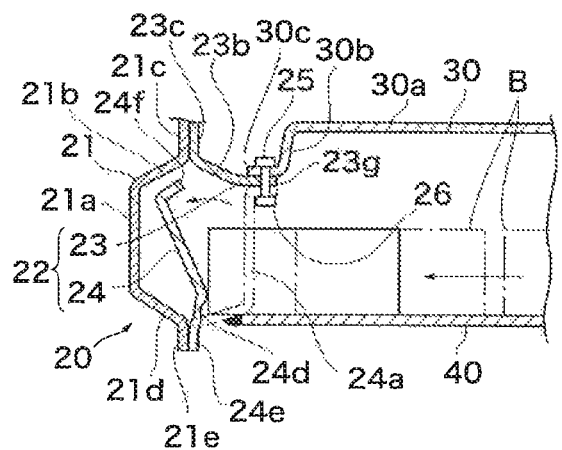
FIG. 2C is an explanatory diagram illustrating a situation in which movement of a battery toward the inside of a side sill is allowed at the time of a load being applied when the battery is moved to one side in the vehicle-width direction and, consequently, a load from the battery is applied to the side sill.

FIGS. 1 and 2 illustrate a first example of the present invention. FIG. 1 is a schematic external view of a motor vehicle. FIG. 2A is a cross-sectional view taken along IIA-IIA of FIG. 1. FIG. 2B is an explanatory diagram illustrating a fastening portion of a lower panel. FIG. 2C is an explanatory diagram illustrating a situation in which movement of batteries toward the inside of the side sill is allowed at the time of a load being applied when the batteries are moved to one side in the vehicle-width direction and, consequently, a load from the batteries is applied to the side sill.

As illustrated in FIG. 1, the motor vehicle 10 has a motor as a driving source for wheels and is provided with batteries B that supply electric power to the motor, as illustrated in FIG. 2. Though the batteries B may have any structure, each of the batteries B according to this example is composed of a plurality of battery cells and a battery case in which the battery cells are disposed.

As illustrated in FIG. 2, the motor vehicle 10 has a vehicle body that is manufactured through the processes of creating panel-like components by press-forming, for instance, steel plates and joining the components by spot welding. The vehicle body has side sills 20 that are disposed in pairs on the right and left sides of the vehicle body and that have bag-shaped cross-sections when viewed from the front of the vehicle, a floor panel that constitutes the bottom of the passenger and luggage compartments and that is coupled to the side sills 20, and a battery panel 40 that is disposed below the floor panel and that is coupled to the side sills 20.

Each of the side sills 20 has an outer panel 21 disposed on the outer side thereof in the vehicle-width direction and an inner panel 22 that is disposed on the inner side thereof in the vehicle-width direction and that forms a bag-shaped cross-section together with the outer panel 21. The outer panel 21, when its cross-section is viewed from the front, has a side member 21a extending vertically, a top member 21b that is angled upward from the upper end of the side member 21a and extends to the inner side in the vehicle-width direction, an upper flange 21c that extends upward from the inner end of the top member 21b, a bottom member 21d that is angled downward from the lower end of the side member 21a and extends to the inner side in the vehicle-width direction, and a lower flange 21e extending downward from the inner end of the bottom member 21d.

In this example, the inner panel 22 has an upper panel 23 and a lower panel 24. The lower panel 24, when its cross-section is viewed from the front, has a side member 24a extending vertically, a bottom member 24d that is angled downward from the lower end of the side member 24a and extends to the outer side in the vehicle-width direction, a lower flange 24e extending downward from the outer end of the bottom member 24d, and an inner flange 24f extending from the upper end of the side member 24a to the inner side in the vehicle-width direction. The upper panel 23, when its cross-section is viewed from the front, has a top member 23b that is angled upward from the upper end of the side member 24a and extends to the outer side in the vehicle-width direction, an upper flange 23c extending upward from the outer end of the top member 23b, and an inner flange 23g extending from the inner end of the top member 23b to the inner side in the vehicle-width direction. The upper panel 23 and the lower panel 24 are fastened to the inner flanges 23g, 24f with a bolt 25 and a nut 26 as fastening components.

More specifically, as illustrated in FIG. 2B, the inner flange 24f of the lower panel 24 has a hole 24g through which the bolt 25 is inserted. In this example, the inner flange 24f has a cutout 24h that extends from the inner side of the hole 24g to the inner end of the flange in the vehicle-width direction. With this arrangement, when subjected to a relatively large load, the inner flange 24f of the lower panel 24 is prevented from being moved to the inner side in the vehicle-width direction. The inner flange 24f is more likely to be moved to the outer side than to the inner side in the vehicle-width direction.

In addition, the outer panel 21 and the inner panel 22 are joined to each other by means of spot welding at the upper flanges 21c, 23c and the lower flanges 21e, 24e. In this example, the upper panel 23, the lower panel 24, the bolt 25, and the nut 26 constitute a battery movement allowance mechanism that allows movement of the batteries B toward the inside of the side sill 20 when the batteries B are moved to one side in the vehicle-width direction and, consequently, a load from the batteries B is applied to the side sill 20.

The floor panel 30 is coupled to the inner panel 22 of the side sill 20. In this example, the floor panel 30, when its cross-section is viewed from the front, has a main body 30a extending in the vehicle-width direction, a vertically extending member 30b extending downward from the outer end of the main body 30a, and an outer flange 30c extending to the outer side from the lower end of the vertically extending member 30b in the vehicle-width direction. The outer flange 30c is fastened together with the inner flange 23g of the upper panel 23 and the inner flange 24f of the lower panel 24 with the bolt 25 and the nut 26. With this arrangement, a fastening portion between the upper panel 23 and the lower panel 24 can be used to couple the side sill 20 and the floor panel 30 to each other.

The battery panel 40 is coupled to the inner panel 22 of the side sill 20. The battery panel 40 supports the batteries B below the floor panel 30. In this example, the batteries B are substantially rectangular parallelpiped and are arranged on the battery panel 40 in such a manner as to be spaced away from one another at predetermined intervals in the longitudinal and vehicle-width directions. In this example, the battery panel 40, when its cross-section is viewed from the front, is substantially flat in the vehicle-width direction and is welded at its outer end to the bottom member 24d of the inner panel 22.

In the motor vehicle 1 having the structure described above, if the batteries B are moved to one side in the vehicle-width direction in the event of a side-impact collision of the motor vehicle, a load from the batteries B (or the inner side of the vehicle) is applied to the side sill 20. At this time, the inner panel 22 disintegrates into the upper panel 23 and the lower panel 24. The side member 24a is pushed toward the inside of the side sill 20 by the batteries B. With this arrangement, movement of the batteries B toward the inside of the side sill 20 is allowed. On the contrary, if the side sill 20 is subjected to a load from the opposite side of the batteries B (or from outside of the vehicle), the inner panel 22 does not easily disintegrate into the upper panel 23 and the lower panel 24.

In particular, in this example, the upper panel 23 and the lower panel 24 are fastened to each other with the bolt 25 and the nut 26 at the inner flanges 23g, 24f extending in the vehicle-width direction. In addition, the inner flange 24f of the lower panel 24 has the cutout 24h that is in communication with the hole 24g of the bolt 25. With this arrangement, the fastening of the upper and lower panels 23, 24 are easily released when subjected to a load from the batteries B. On the other hand, the fastening is not easily released when subjected to a load from the opposite side of the batteries B, providing a capability to resist a load. Furthermore, stiffness required for normal operation of the vehicle is ensured.

As described above, in the motor vehicle 10 according to this example, if, in the event of a side impact collision or the like, the batteries B are moved to one side in the vehicle-width direction and, consequently, a load from the batteries B is applied to the side sill 20, movement of the batteries B toward the inside of the side sill 20 is allowed. Moving or guiding the batteries B toward the inside of the side sill 20 reduces or prevents separation of the batteries B from the vehicle body. In addition, guiding the batteries B toward the inside of the side sill 20 ensures the amount of movement of the batteries B associated with a side-impact collision. This enables the batteries B to be disposed close to the side sill 20, thereby increasing the mounting space of the batteries B in the vehicle-width direction.

Furthermore, in the motor vehicle 10 according to this example, the structure in which movement of the batteries B toward the inside of the side sill 20 is allowed eliminates the necessity for the outer sides in the vehicle-width direction of the batteries B in the vehicle body to be made excessively robust. Accordingly, if an object penetrates the vehicle body to one side from the other side in the vehicle-width direction in the event of a side-impact collision, the side sill 20 on the other side in the vehicle-width direction can be deformed to absorb the energy of the impact, thereby ensuring the amount of a stroke that the object moves before the batteries B start to be moved. Consequently, unlike a structure in which the outer sides of the batteries are robust and in which the vehicle body does not sufficiently deform on the other side thereof, a deterioration in side-impact collision performance can be avoided.

Though the upper panel 23 and the lower panel 24 are fastened to each other at the inner flanges 23g, 24f in the example described above, any structure in which the upper panel 23 and the lower panel 24 break away may be used.

Figure 3A:
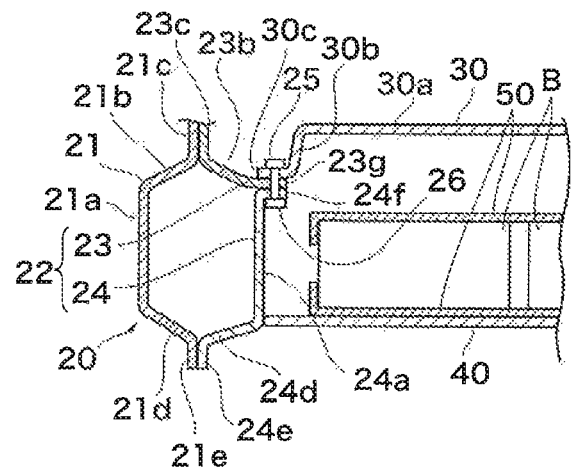
FIGS. 3A, 3B, and 3C illustrate a second example of the present invention.
Figure 3B:
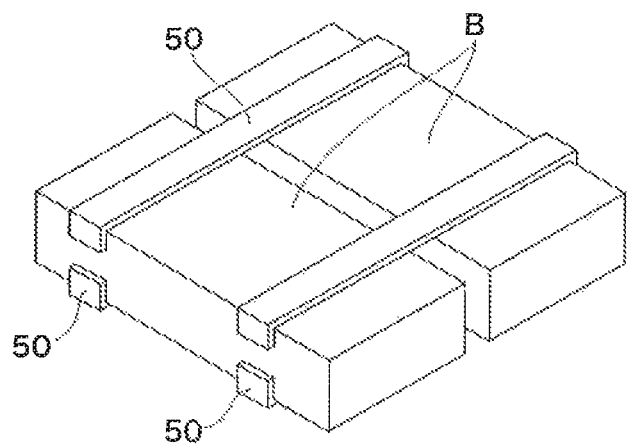
Figure 3C:
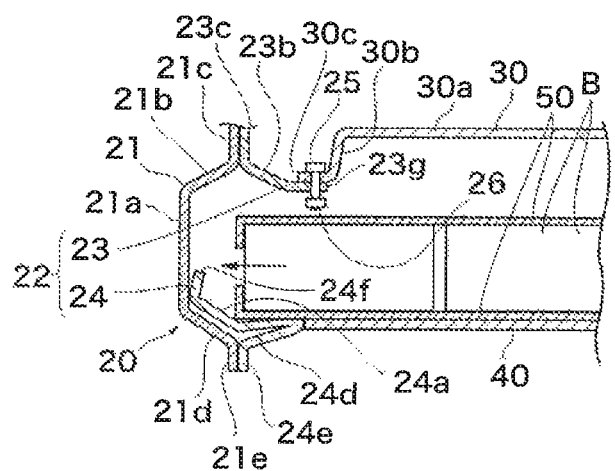

FIG. 3 illustrates a second example of the present invention. FIG. 3A is a schematic cross-sectional view of a motor vehicle. FIG. 3B is an external perspective view of a battery and a stay. FIG. 3C is an explanatory diagram illustrating a situation in which movement of a battery toward the inside of the side sill is allowed at the time of a load being applied when the battery is moved to one side in the vehicle-width direction and, consequently, a load from the battery is applied to the side sill.

As illustrated in FIG. 3A, the motor vehicle according to the second example is the motor vehicle according to the first example that has stays 50 securing the batteries B and extending in the vehicle-width direction. In this example, the stays 50 are provided on the upper and lower surfaces of the batteries B. As illustrated in FIG. 3B, the stays 50 secure all of the plurality of batteries B arranged in the vehicle-width direction. As illustrated in FIG. 3C, the stays 50 break the inner side of the side sill 20 if the batteries B are moved to one side in the vehicle-width direction in the event of a side-impact collision of the motor vehicle 10 and, consequently, a load from the batteries B is applied to the side sill 20. In other words, in this example, the upper panel 23, the lower panel 24, the bolt 25, and the nut 26, plus the stays 50 constitute a battery movement allowance mechanism that allows movement of the batteries B toward the inside of the side sill 20. Needless to say, the battery movement allowance mechanism may consist of the stays 50 only without a mechanism involving the upper panel 23, the lower panel 24, the bolt 25, and the nut 26.

Figure 4A:
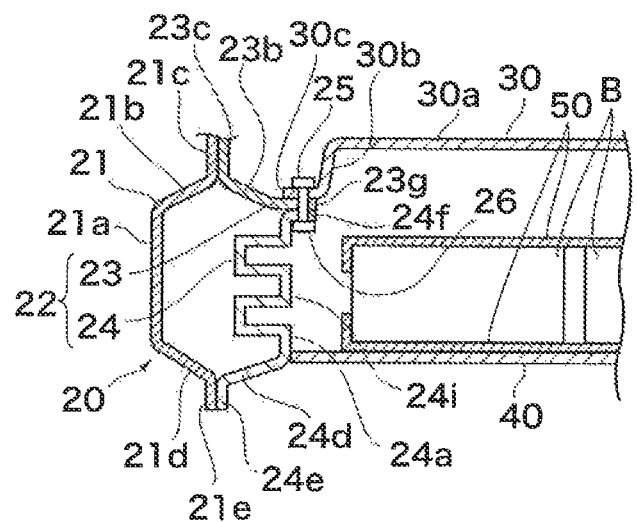
FIGS. 4A and 4B illustrate a third example of the present invention.
Figure 4B:
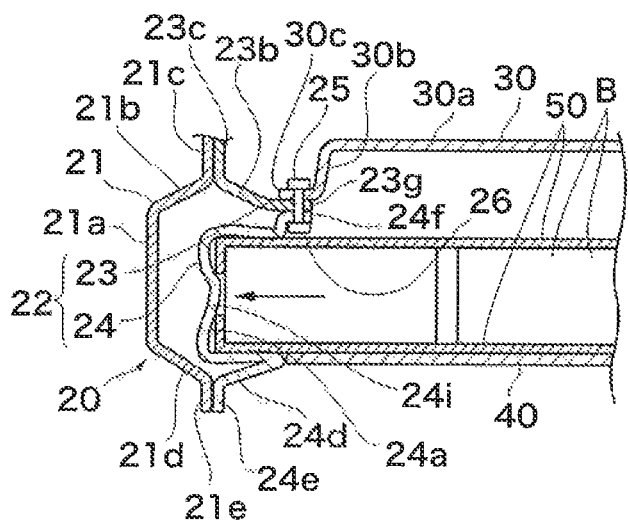

FIG. 4 illustrates a third example of the present invention. FIG. 4A is a schematic cross-sectional view of a motor vehicle. FIG. 4B is an explanatory diagram illustrating a situation in which movement of a battery toward the inside of the side sill is allowed at the time of a load being applied when the battery is moved to one side in the vehicle-width direction and, consequently, a load from the battery is applied to the side sill.

As illustrated in FIG. 4A, the motor vehicle according to the third example is the motor vehicle according to the second example in which the side member 24a of the inner panel 22 has a bellows-shaped portion 24i. The bellows-shaped portion 24i is formed in an area that comes into contact with the batteries B at the time of a load being applied. As illustrated in FIG. 4B, movement of the batteries B toward the inside of the side sill 20 is allowed when the bellows-shaped portion 24i is subjected to a pressing force by the batteries B in the event of a side-impact collision of the motor vehicle 10 and, consequently, is extended toward the inside of the side sill 20. In this example, the bellows-shaped portion 24i can be effectively deformed due to the presence of the stays 50. Note that the absence of the stays 50 does not hinder the deformation of the bellows-shaped portion 24i. In addition, in this example, after the bellows-shaped portion 24i is fully extended, separation of the upper panel 23 and the lower panel 24 from each other takes place. If a performance requirement can be met through the use of only the bellows-shaped portion 24i, the inner panel 22 needs not be provided with a mechanism for the separation of the upper panel 23 and the lower panel 24 from each other.

Figure 5A:
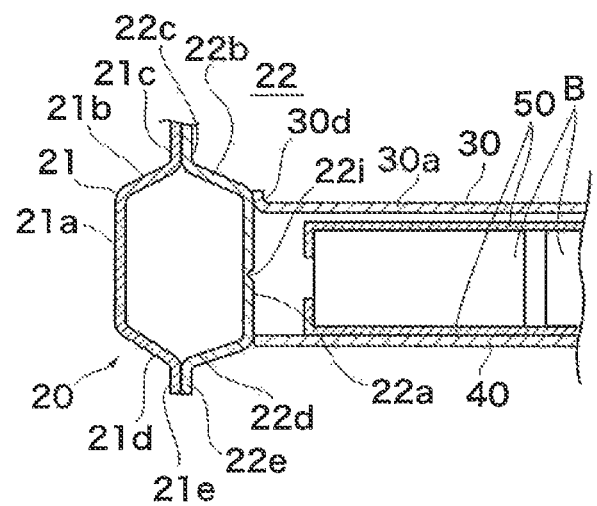
FIGS. 5A and 5B illustrate a fourth example of the present invention.
Figure 5B:
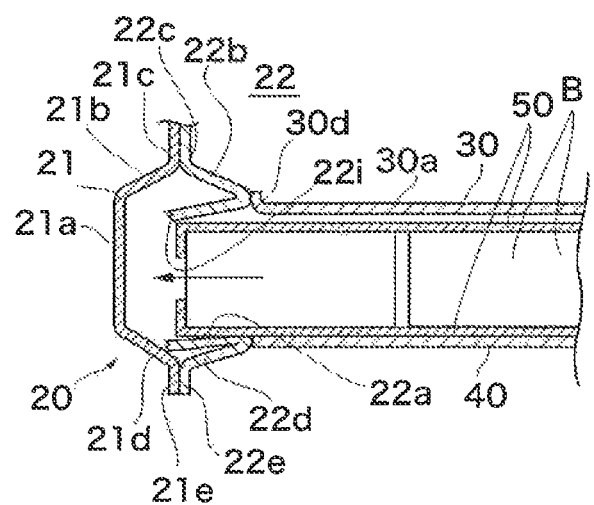

FIG. 5 illustrates a fourth example of the present invention. FIG. 5A is a schematic cross-sectional view of a motor vehicle. FIG. 5B is an explanatory diagram illustrating a situation in which movement of a battery toward the inside of the side sill is allowed at the time of a load being applied when the battery is moved to one side in the vehicle-width direction and, consequently, a load from the battery is applied to the side sill.

As illustrated in FIG. 5A, the motor vehicle according to the fourth example is the motor vehicle according to the first example in which the inner panel 22 is inseparable so as not to disintegrate into the upper panel 23 and the lower panel 24 and has a dashed-line-like thin-wall portion 22i extending longitudinally therein. The inner panel 22, when its cross-section is viewed from the front, has a side member 22a extending vertically, a top member 22b that is angled upward from the upper end of the side member 22a and extends to the inner side in the vehicle-width direction, an upper flange 22c that extends upward from the inner end of the top member 22b, a bottom member 22d that is angled downward from the lower end of the side member 22a and extends to the inner side in the vehicle-width direction, and a lower flange 22e extending downward from the inner end of the bottom member 22d. In addition, the floor panel 30, when its cross-section is viewed from the front, has a main body 30a extending in the vehicle-width direction and an upper flange 30d extending upward from the outer end in the vehicle-width direction of the main body 30a. The upper flange 30d is coupled to the inner panel 22 by welding or the like. As illustrated in FIG. 5B, movement of the batteries B toward the inside of the side sill 20 is allowed when the inner panel 22 is subjected to a pressing force by the batteries B in the event of a side-impact collision of the motor vehicle 10 and, consequently, breaks, with the thin-wall portion 22i as a starting point.

Although the present invention has been described above in terms of a preferred example, the present invention is not limited to the foregoing preferred example. The battery movement allowance mechanism is modifiable. The example described above places no limitations on the scope of the present invention. In addition, not all of the features described in the example are essential to solve the problem of the present invention.

The invention claimed is:

1. A motor vehicle comprising:
    side sills that are disposed on respective right and left sides of the motor vehicle and that each have a bag-shaped cross-section when viewed from the front of the motor vehicle;
    a floor panel that constitutes a bottom of at least a passenger compartment and that is coupled to the side sills;
    a battery panel that is disposed below the floor panel and coupled to the side sills, the battery panel supporting batteries; and
    a battery movement allowance mechanism that allows movement of the batteries toward the inside of a receiving side sill at the time of a load being applied when the batteries are moved to one side in a vehicle-width direction and, consequently, a load from the batteries is applied to the receiving side sill,
    wherein each of the side sills comprises an outer panel disposed on the outer side thereof in the vehicle-width direction and an inner panel that is disposed on the inner side in the vehicle-width direction and that forms the bag-shaped cross-section together with the outer panel; and
    wherein the inner panel comprises an upper panel and a lower panel that are able to separate from each other at the time of the load being applied.

2. The motor vehicle according to claim 1, further comprising:
- a first inner flange that is formed at the lower end of the upper panel and that extends toward the inner side in the vehicle-width direction;
- a second inner flange that is formed at the upper end of the lower panel and that extends toward the inner side in the vehicle-width direction; and
- a fastening portion at which the first inner flange and the second inner flange are fastened.

3. The motor vehicle according to claim 2, wherein the fastening portion is a portion at which the floor panel is fastened together with the first inner flange and the second inner flange.

4. The motor vehicle according to claim 1, wherein the inner panel comprises a bellows-shaped portion that comes into contact with the batteries at the time of the load being applied.

5. The motor vehicle according to claim 2, wherein the inner panel comprises a bellows-shaped portion that comes into contact with the batteries at the time of the load being applied.

6. The motor vehicle according to claim 3, wherein the inner panel comprises a bellows-shaped portion that comes into contact with the batteries at the time of the load being applied.

7. The motor vehicle according to claim 1, wherein the inner panel comprises a linear thin-wall portion or a hole and, the inner panel being configured at the time of the load being applied, to break, with the thin-wall portion or the hole at a starting point.

8. The motor vehicle according to claim 2, wherein the inner panel comprises a linear thin-wall portion or a hole and, the inner panel being configured at the time of the load being applied, to break, with the thin-wall portion or the hole at a starting point.

9. The motor vehicle according to claim 3, wherein the inner panel comprises a linear thin-wall portion or a hole and, the inner panel being configured at the time of the load being applied, to break, with the thin-wall portion or the hole at a starting point.

10. The motor vehicle according to claim 1, further comprising:
- a stay that secures the batteries and extends in the vehicle-width direction, the stay being configured, at the time of the load being applied, to deform the inner side in the vehicle-width direction of the side sills.

11. The motor vehicle according to claim 2, further comprising:
- a stay that secures the batteries and extends in the vehicle-width direction, the stay being configured, at the time of the load being applied, to deform the inner side in the vehicle-width direction of the side sills.

12. The motor vehicle according to claim 3, further comprising:
- a stay that secures the batteries and extends in the vehicle-width direction, the stay being configured, at the time of the load being applied, to deform the inner side in the vehicle-width direction of the side sills.

13. A motor vehicle comprising:
- side sills that are disposed on respective right and left sides of the motor vehicle and that each have a bag-shaped cross-section when viewed from the front of the motor vehicle;
- a floor panel that constitutes a bottom of at least a passenger compartment and that is coupled to the side sills;
- a battery panel that is disposed below the floor panel and coupled to the side sills, the battery panel supporting batteries; and
- a battery movement allowance mechanism that allows movement of the batteries toward the inside of a receiving side sill at the time of a load being applied when the batteries are moved to one side in a vehicle-width direction and, consequently, a load from the batteries is applied to the receiving side sill,
- wherein each of the side sills comprises an outer panel disposed on the outer side thereof in the vehicle-width direction and an inner panel that is disposed on the inner side in the vehicle-width direction and that forms the bag-shaped cross-section together with the outer panel; and
- wherein the inner panel comprises a bellows-shaped portion that comes into contact with the batteries at the time of the load being applied.

14. A motor vehicle comprising:
- side sills that are disposed on respective right and left sides of the motor vehicle and that each have a bag-shaped cross-section when viewed from the front of the motor vehicle;
- a floor panel that constitutes a bottom of at least a passenger compartment and that is coupled to the side sills;
- a battery panel that is disposed below the floor panel and coupled to the side sills, the battery panel supporting batteries; and
- a battery movement allowance mechanism that allows movement of the batteries toward the inside of a receiving side sill at the time of a load being applied when the batteries are moved to one side in a vehicle-width direction and, consequently, a load from the batteries is applied to the receiving side sill;
- wherein each of the side sills comprises an outer panel disposed on the outer side thereof in the vehicle-width direction and an inner panel that is disposed on the inner side in the vehicle-width direction and that forms the bag-shaped cross-section together with the outer panel; and
- wherein the inner panel comprises a linear thin-wall portion or a hole and, the inner panel being configured at the time of the load being applied, to break, with the thin-wall portion or the hole at a starting point.

15. The motor vehicle according to claim 14, wherein the inner panel comprises the linear thin-walled portion.

16. The motor vehicle according to claim 14, wherein the inner panel comprises the hole.

* * * * *